US008849793B2

(12) United States Patent
Vexler (10) Patent No.: US 8,849,793 B2
(45) Date of Patent: Sep. 30, 2014

(54) DEVICES FOR PROVIDING DISTRIBUTABLE MIDDLEWARE DATA PROXY BETWEEN APPLICATION SERVERS AND DATABASE SERVERS

(75) Inventor: Vladimir Vexler, Bat Yam (IL)

(73) Assignee: SafePeak Technologies Ltd., Kiryat-Gat (IL)

(*) Notice: Subject to any disclaimer, the term of this patent is extended or adjusted under 35 U.S.C. 154(b) by 235 days.

(21) Appl. No.: 12/602,099

(22) PCT Filed: May 29, 2008

(86) PCT No.: PCT/IL2008/000729
§ 371 (c)(1),
(2), (4) Date: Nov. 26, 2009

(87) PCT Pub. No.: WO2008/149337
PCT Pub. Date: Dec. 11, 2008

(65) Prior Publication Data
US 2010/0174939 A1    Jul. 8, 2010

Related U.S. Application Data

(60) Provisional application No. 60/933,101, filed on Jun. 5, 2007.

(51) Int. Cl.
*G06F 7/00* (2006.01)
*G06F 17/30* (2006.01)

(52) U.S. Cl.
CPC .................................. *G06F 17/3048* (2013.01)
USPC ........................... 707/716; 707/764; 707/770

(58) Field of Classification Search
CPC ....................... G06F 17/3048; G06F 17/03483
USPC .......................................... 707/716, 764, 770
See application file for complete search history.

(56) References Cited

U.S. PATENT DOCUMENTS

| | | | | |
|---|---|---|---|---|
| 5,802,304 | A * | 9/1998 | Stone | 709/227 |
| 6,374,241 | B1 * | 4/2002 | Lamburt et al. | 1/1 |
| 6,578,068 | B1 | 6/2003 | Bowman-Amuah | |
| 2002/0007373 | A1 * | 1/2002 | Blair et al. | 707/505 |
| 2002/0116457 | A1 * | 8/2002 | Eshleman et al. | 709/203 |
| 2006/0069719 | A1 | 3/2006 | McCanne et al. | |

OTHER PUBLICATIONS

International Search Report for PCT/IL2008/000729 mailed on Nov. 5, 2008, Dec. 11, 2008, DCF Tech. Ltd.

* cited by examiner

*Primary Examiner* — Mariela Reyes
(74) *Attorney, Agent, or Firm* — Pearl Cohen Zedek Latzer Baratz LLP (57) ABSTRACT

The present invention discloses devices including a transparent client-connection manager for exchanging client data between application servers and the device: a request analyzer for analyzing query requests from at least one application server; a data-retrieval/command-execution module for executing query requests; a database connection manager for exchanging database data between at least one database server and the device; a cache-memory pool for storing data items from at least one database server; a cache-policy module for determining cache criteria for storing the data items In the cache-memory pool; and a data-consistency invalidation module for determining invalidated data items based on invalidation criteria for removing from the cache-memory pool. The cache-memory pool is configured to utilize memory modules residing in data proxy devices and distributed cache management utility, enabling the memory capacity to be used as a cluster to balance workloads.

16 Claims, 4 Drawing Sheets

DEVICES FOR PROVIDING DISTRIBUTABLE MIDDLEWARE DATA PROXY BETWEEN APPLICATION SERVERS AND DATABASE SERVERS

CROSS-REFERENCES TO RELATED APPLICATIONS

This application is a National Stage application of PCT/IL08/000729, filed on May 29, 2008, which claims the benefit of U.S. Provisional Application No. 60/933,101, filed Jun. 5, 2007. The disclosures of the PCT and Provisional applications are hereby incorporated by reference in their entirety.

FIELD AND BACKGROUND OF THE INVENTION

The present invention relates to devices for providing distributable middleware data proxy between application servers and database servers.

The enormous and growing Internet population with unpredictable usage patterns, combined with today's communication technologies introduce severe challenges in scalability, especially for database servers. Internet applications have an enormous number of users, report very fast growth, and suffer from unpredictable traffic peaks. Traditional businesses are increasingly using online transaction processing (OLTP) applications or portals that require high availability and real-time performance. Additionally, e-commerce businesses need "24/7" availability.

Existing relational-database management systems (RDBMS), such as MS SQL Server, Oracle, MySql, Sybase, and DB2, suffer from scalability constraints due to the number of transactions that are required to be executed. RDBMS's prime function has shifted today from managing information (or data) to delivering the data. Recently, it was shown that the only way to really scale any system is by "scaling out", or distributing the workload on an expandable number of machines. However, scaling out databases is still a "near to impossible" task. Such tasks are either very complicated, risky, or even do not exist for certain database vendors.

Retrieval of data from databases by various clients creates a burden on the database server to retrieve and deliver the data. Current networked databases are responsible both for the handling of the data (e.g. insert/update/delete), and for the delivery of data.

In the prior art, systems and methods for cache capable of connecting multiple JAVA databases are known in which data is served from cache (see Korean Patent Publication No. 20030054110). U.S. Pat. No. 6,154,749 teaches a distributed caching scheme for database systems. U.S. Pat. No. 6,167,438 teaches a method and system for distributed caching, prefetching, and replication. WO Patent Publication No. 03081464 teaches a database system comprising database access object with cache. However, such approaches require application redesign and manual cache configuration. Furthermore, such approaches are limited to specific databases, do not validate data for consistency, and are not amenable to scaling out database servers. Such approaches still require application servers to perform many of the tasks routinely performed in a "non-cached data" environment, such as determining data validity.

It would be desirable to have devices for providing distributable middleware data proxy between application servers and database servers, which can continuously scale existing or new databases and information systems, without the need to redesign the application, make any changes in the database, and make significant upgrades to the database servers to scale-up and/or upgrade the data-center storage system.

SUMMARY OF THE INVENTION

It is the purpose of the present invention to provide devices for providing distributable middleware data proxy between application servers and database servers. The present invention allows information systems, in general, to be scaled, and particularly databases, without database or application redesign or reconfiguration. Furthermore, auto-learning mechanisms reduce the management time of such systems to almost zero.

For the purpose of clarity, the terms which follow are used as set forth herein. The term "transparent client-connection manager" is used to refer to a client-connection manager that exchanges data with an application server without requiring the application server to reconfigure the data format, and without requiring the application to be reconfigured. A transparent client-connection manager uses necessary APIs for interfacing with an application server. The expression "transparently exchanging client data" is used to refer to the process of exchanging data with an application server without requiring the application server to reconfigure the data format, and without requiring the application to be reconfigured.

Preferred embodiments of the present invention teach data-proxy devices for bringing database access closer to the application server, saving traffic bottlenecks, time, and server resources. Using smart-caching algorithms, the data-proxy devices save the results of queries in cache memory. By providing data from cache memory, "round-trip overhead" is minimized, and workload pressure of the database is significantly reduced.

The data-proxy device is configured to handle large-scale read-write databases. The data-proxy device automatically analyzes usage traffic and connections between objects. The data-proxy device has auto-learning mechanisms for:
(1) building optimal caching patterns; and
(2) 100% data-consistency validation at all times (including during read/write database transactions).

Preferred embodiments of the present invention enable the processes of data delivery and data handling to be separated in which data delivery is handled by the data-proxy device (either a single device or multiple, connected devices). By separating data delivery from the database:
(1) a large portion of database resources are freed; and
(2) scalability is automatically upgraded because it is always possible to expand this layer without changing the database center itself.

The data-proxy device is a distributable middleware data proxy between application servers and database servers or data centers. A function of the device is to intercept data requests from application servers (i.e. the clients) and the data responses from database servers. The data-proxy device caches the data between the servers. Upon receiving a previously-issued request, the data-proxy device returns the data from cache memory, eliminating the need to go to the database server.

The data-proxy device is configured for both for read-write databases as well as read-only databases. The data-proxy device includes the following internal functions as well.

Cache-policy creation based on: (a) the frequency of query requests for specific data, (b) the frequency of data changes (e.g. insert, update, or delete), and (c) the amount of available memory in the device. Cache policies determine what data can be cached, and designate the optimal time for caching the data.

Data-consistency validation provides a guarantee that the cached data is always correct. When data changes occur, cached data is either dropped or refreshed.

Logging & monitoring.

Failsafe & redundancy mechanisms.

Distributed cache capabilities enables multiple data-proxy devices that are interconnected to use the collective cache memory of all the devices like a single memory resource, allowing scalability by increasing the number of connected data-proxy devices.

Therefore, according to the present invention, there is provided for the first time a device for providing distributable middleware data proxy, the device including: (a) a client-connection manager for exchanging client data between at least one application server and the device; (b) a request analyzer for analyzing query requests from at least one application server; (c) a data-retrieval/command-execution module for executing the query requests; (d) a database-connection manager for exchanging database data between at least one database server and the device; (e) a cache-memory pool for storing data items from at least one database server; (f) a cache-policy module for determining cache criteria for storing the data items in the cache-memory pool; and (g) a data-consistency invalidation module for determining invalidated data items based on invalidation criteria for removing from the cache-memory pool.

Preferably, the request analyzer is configured for: (i) creating hashed query-specific keys of the query requests; and (ii) identifying a query type of the query requests.

Preferably, the cache-memory pool is configured to utilize respective memory modules residing in a plurality of operationally-connected data-proxy devices.

More preferably, the device further includes: (h) a distributed-cache management utility for managing memory capacity in the memory modules.

Most preferably, the distributed-cache management utility enables the memory capacity to be utilized as a memory cluster in order to balance workloads of the memory capacity.

Preferably, the device further includes: (h) a logger for logging details of the query requests.

Most preferably, the details includes at least one detail selected from the group consisting of: each query request, a hashed query-specific key, a request type, a query date/time, client information, database-server details, data-retrieval source, cache type, data checksum, a data-retrieval date/time, a timestamp, client IP information, and query information.

Preferably, the device further includes: (h) a database agent for: (i) monitoring data changes in at least one database server; and (ii) reporting the data changes to the data-consistency invalidation module.

Preferably, the device further includes: (h) a failsafe utility for enabling an alternate data-proxy device, operationally connected to the device, to provide device functionality upon an occurrence of a device failure.

Preferably, the device further includes: (h) a database load-balancer for load-balancing in at least one database server.

Preferably, the device further includes: (h) a special-procedures analyzer utility for parsing and analyzing executable code in the query requests.

Preferably, the cache criteria include at least one criterion selected from the group consisting of: a query-request frequency, a data-change frequency, and an available cache-memory capacity.

Preferably, the data-retrieval/command-execution module is operative to activate triggers for detecting the invalidated data items.

Preferably, the invalidation criteria include at least one criterion selected from the group consisting of: an update in the database data, a deletion in the database data, an insertion in the database data, an update in secondary database data referenced in the database data, a deletion in the secondary database data referenced in the database data, and an insertion in the secondary database data referenced in the database data.

Preferably, the request analyzer is configured for parsing the query requests.

Most preferably, the parsing assists in identifying the invalidated data items.

According to the present invention, there is provided for the first time a method for providing distributable middleware data proxy, the method including the steps of: (a) exchanging client data between at least one application server and a data-proxy device; (b) analyzing query requests from at least one application server; (c) executing the query requests; (d) exchanging database data between at least one database server and the data-proxy device; (e) determining criteria for storing data items from at least one database server in data-proxy device; (f) storing the data items from at least one database server in the data-proxy device; and (g) determining invalidated data items for removing from the data-proxy device.

Preferably, the method further includes the step of (h) managing memory capacity in respective memory modules residing in a plurality of operationally-connected data-proxy devices.

Most preferably, the step of managing includes utilizing the memory capacity as a memory cluster in order to balance workloads of the memory capacity.

Preferably, the method further includes the steps of: (h) monitoring data changes in at least one database server; and (i) reporting the data changes to the data-proxy device.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to devices for providing distributable middleware data proxy between application servers and database servers. The principles and operation for providing such middleware data proxy, according to the present invention, may be better understood with reference to the accompanying description and the drawings.

Figure 1:
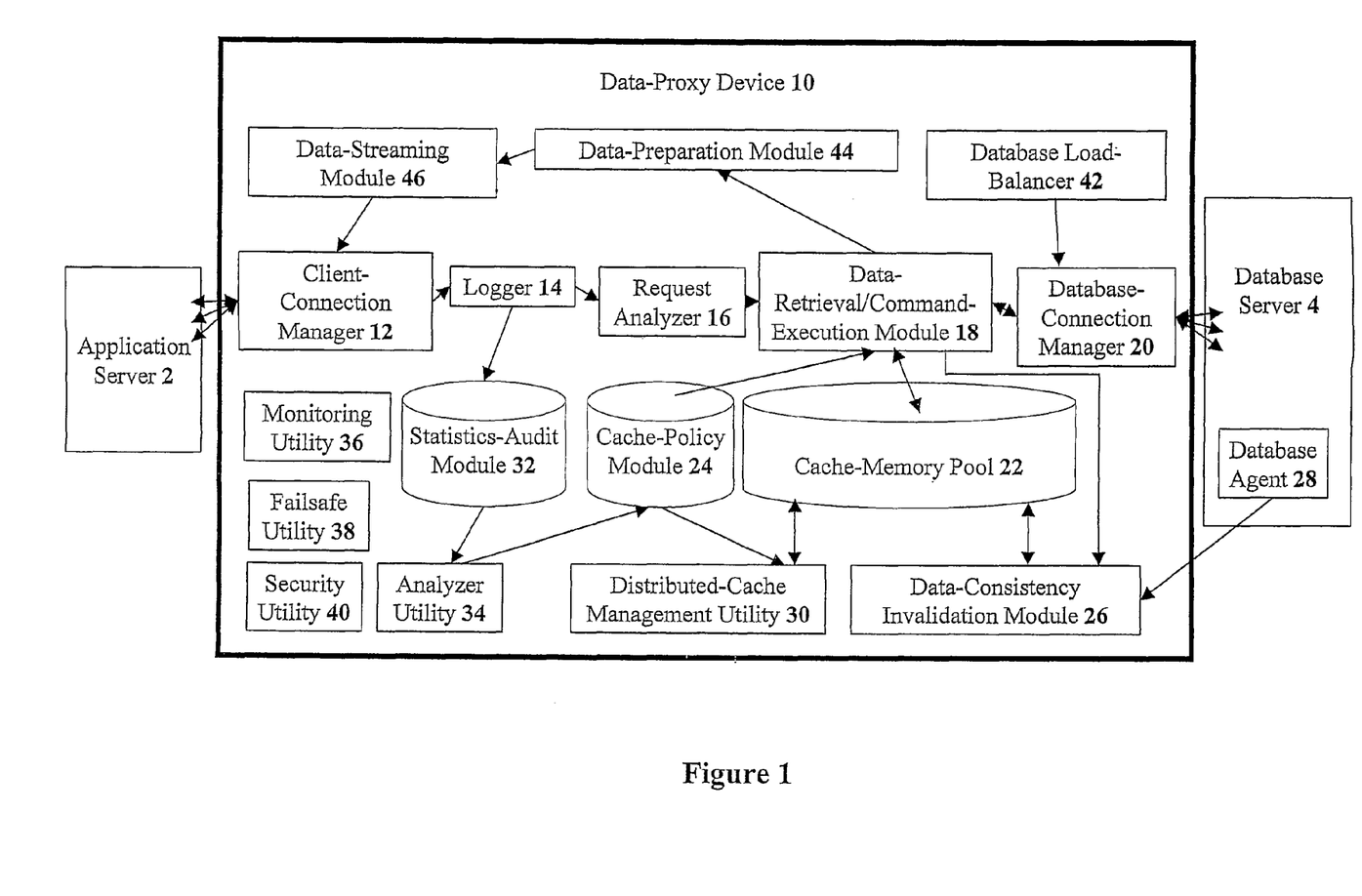
FIG. 1 is a simplified schematic block diagram of a data-proxy device implemented between an application server and a database server, according to preferred embodiments of the present invention.

Referring now to the drawings, FIG. 1 is a simplified schematic block diagram of a data-proxy device implemented between an application server and a database server, according to preferred embodiments of the present invention. An application server 2 (i.e. the client) and a database server 4 are shown connected via a data-proxy device 10. Data-proxy device 10 is operationally connected to a LAN network using a standard network switch like other servers (including application server 2 and database server 4). This enables data-proxy device 10:

(1) to be detected by standard network-monitoring utilities; and
(2) to detect all other servers on the network, including application server 2 and database server 4.

Data-proxy device 10 includes: a transparent client-connection manager 12, a logger 14, a request analyzer 16, a data-retrieval/command-execution module 18, a database-connection manager 20, a cache-memory pool 22, a cache-policy module 24, a data-consistency invalidation module 26, a database agent 28, a distributed-cache management utility 30, a statistics-audit module 32, an analyzer utility 34, a monitoring utility 36, a failsafe utility 38, a security utility 40, a database load-balancer 42, a data-preparation module 44, and a data-streaming module 46.

Client-connection manager 12 is responsible for the connecting application server 2, which requests data via query requests, and data-proxy device 10. Client-connection manager 12 is also responsible for returning application server 2 with data responses to.

By imitating standard, database, network protocols, data-proxy device 10 appears to application server 2 as a standard database server (i.e. database server 4). Examples of such network protocols include: TDS 7.x+ for Microsoft SQL Server, TDS for Sybase, MySql Protocol for MySql, DRDA-JDB2 Connect for DB2, and Sql*Net for Oracle.

Logger 14 logs all requests into an internal database (e.g. Mysql, Berkley, or other types of standard RDBMS). The data that is logged includes:
query request;
hashed key of the query request;
request type;
query date/time;
client information;
details of target database server 4;
whether data is from cache-memory pool 22 or from database server 4;
type of cache selected;
checksum of the data which is a hashed key of the data (used for analysis to detect data changes);
data-retrieval date/time when data was taken from database server 4; and
timestamp;

The logs generated by logger 14 serves several purposes including:
(1) a basis for cache-policy creation and statistical analysis via cache-policy module 24 and statistics-audit module 32;
(2) a source for monitoring data-flow statistics via statistics-audit module 32 and monitoring utility 36; and
(3) a resource for auditing security via security utility 40.

The process of logging is performed asynchronously with virtually no impact on the performance of data-proxy device 10.

Among other things, request analyzer 16 is responsible for:
(1) creating query-specific keys using hash algorithms (e.g. Tiger-Hash, MD5, or SHA1);
(2) identifying query type for determining whether the relevant data can/should be cached or served from cache-memory pool 22; and
(3) transmitting the query-specific key and query type to data-retrieval/command-execution module 18.

Data-retrieval/command-execution module 18 is usually launched by request analyzer 16 in the process of retrieving parameters the query request, the query-specific key and the query type. Data-retrieval/command-execution module 18 is responsible for several tasks including:
(1) returning data from cache-memory pool 24 to client-connection manager 12 (if the data is already in cache-memory pool 22);
(2) executing query in database server 4 (if the data is not already in cache-memory pool 24), and returning the data response to client-connection manager 12; and
(3) asynchronously:
(a) for a "cacheable" data type, storing the data in cache-memory pool 22 (via forking a new process); and
(b) checking in a pre-defined list if execution of the query should launch one or more triggers;
(c) launching any triggers for invalidating (i.e. "dropping") cached data from cache-memory pool 22.

Execution of queries in database server 4 is performed via database-connection manager 20. Triggers are defined for handling data consistency and integrity. Data-proxy device 10 is configured to interface read-write databases, meaning data-proxy device 10:
(1) handles insert/update/delete query requests, and executes such queries in database server 4;
(2) handles changes to data which may occur from external processes (e.g. scheduled data transformation services (DTS) and/or other back-end application processes that make changes without going through data-proxy device 10); and
(3) provides the most current and accurate data at all times.

In order to provide such capabilities, data-proxy device 10 caches as much data as possible according to assessment, via analyzer utility 34, of cache policies defined in cache-policy module 24. When data changes occur, data-proxy device 10 can:
(1) identify the cached items, including the data rows/columns that were changed; and
(2) invalidate and remove the changed items from cache-memory pool 22.

Upon a query request for the same data which was affected by the change, the query will be executed in database server 4 and cached again in cache-memory pool 22. The identification of what is affected by a data change is performed by internal mechanisms including pre-defined triggers which are commands that are executed in cases of execution-specific queries. An example of a trigger is:

```
<trigger_command smart = "true">
<example>EXECUTE UpdateUserNewsletters @user_id = 722191,
@IsAdds = 1
</example>
<prefix>EXECUTE UpdateUserNewsletters</prefix>
<suffix>@user_id = </suffix>
<suffix_params>~~1.6~~</suffix_params>
</trigger_command>
<query>EXECUTE GetUserNewslettersAlerts @UserID =
~~1~~</query>
```

Such a trigger means that when a command starts with "EXECUTE UpdateUserNewsletters" with a specific @user_id, the trigger drops the read query-request: "EXECUTE GetUserNewslettersAlerts @UserID=_______" from cache-memory pool 22. Trigger policies are based on:
  (1) dependencies between database objects, tables, triggers, stored procedures, foreign keys, and database metadata in database server 4;
  (2) the parsing and analysis of query-string context (e.g. finding relations between queries); and
  (3) data received by data-consistency invalidation module 26 from database agent 28.

The creation of such cache-dropping triggers is performed by two units: data-consistency invalidation module 26 and database agent 28 (installed in database server 4). These units are described below.

Data-proxy device 10 creates a correlation list between all related read and write query-requests. Below is an example of a correlated set of read and write query-requests.
  Read query-request: Get a pricelist for all dogs in table "Animals".
  Write query-request: Update the price in table "Animals" where the type is "dog".

When the write query-request is processed, the data of the read query-request has to be removed from cache-memory pool 22. Furthermore, during the process of executing the query that performs the changes, all related read query-requests need to be "locked". A locked query-request is transferred directly to database server 4, and the data response is not cached. A query-request can only be cached again, when a locked status has been removed (using the related pre-defined cache policy).

If a data change is being processed, all related read query-requests are forwarded to database server 4 for handling data consistency and locking requests. In special cases in which database vendors have defined sophisticated logic and algorithms (which can change from version to version or be manually configured), locking of requests during the data changes is left to database server 4.

Database agent 28 serves to:
  (1) monitor what data changes in database server 4 cause which specific commands; and
  (2) monitor "back-end" data changes (e.g. batch commands, DTS execution, execution of commands by a client other than data-proxy device 10, and direct online changes by a DBA).

In implementations, each database vendor has a different version of database agent 28; even different database versions can have potentially different database agents 28. Such database-specific agents serve the same function, but utilize different technology.

Figure 4:
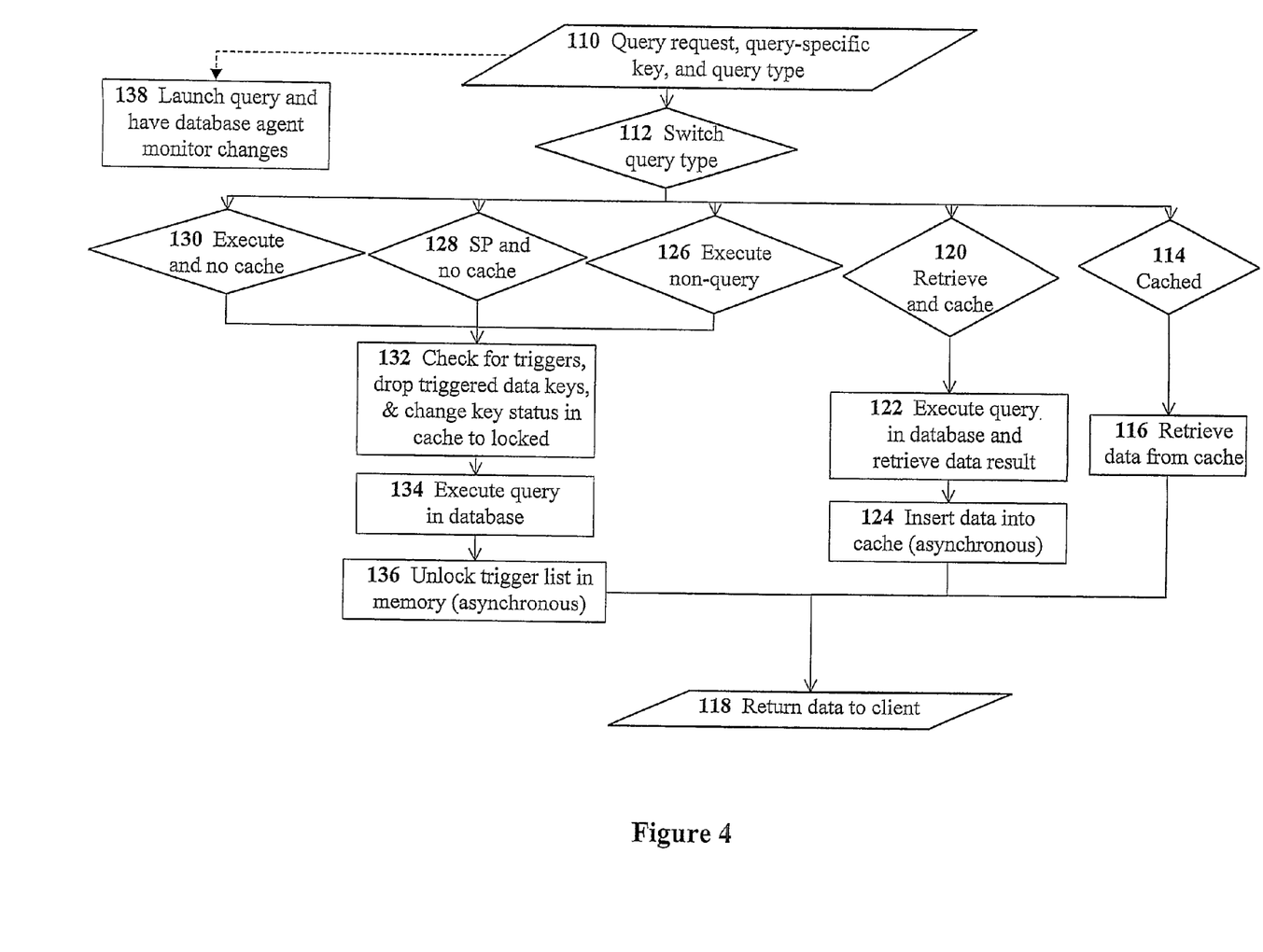
FIG. 4 is a simplified flowchart of the operational procedures of the data retrieval/command execution module of FIG. 1, according to preferred embodiments of the present invention.

When data-proxy device 10 receives a query request that is identified as a potential data-changing query, a message is sent to database agent 28 to monitor the as described with regard to FIG. 4. Database agent 28 monitors database server 4 by:
  (1) monitoring the mapping of memory objects that are responsible for a query-execution plan; and
  (2) monitoring the transaction log.

Database agent 28 creates a monitoring report that is sent to data-consistency invalidation module inside data-proxy device 10. The report includes:
  (1) the query that performed the data change that initiated the monitoring process; and
  (2) which tables and rows were affected by the query execution.

In order to keep track of data changes that are not being made through data-proxy device 10, via a back-end process (e.g. DTS), database agent 28 can be configured to check periodically for data changes written in the transaction log.

After configuration, database agent 28 automatically checks all data changes that were made in database server 4 and recorded in the transaction log. Database agent 28 creates an external-change report, which is sent to data-consistency invalidation module 26 inside data-proxy device 10, indicating the data changes (e.g. tables and rows) that were made to database server 4.

Data-consistency invalidation module 26 is responsible for invalidating and removing cached data that is no longer valid from cache-memory pool 22 due to data changes that were made. Data-consistency invalidation module 26 can be executed by data-retrieval/command-execution module 18, launching a pre-defined list of invalidation rules. Data-consistency invalidation module 26 also uses the monitoring and external-change reports from database agent 28. Data-proxy device 10 then finds the cached data items that are related to the changed database objects in database server 4 using a key list created and managed by cache-policy module 24 and analyzer utility 34 (described below), and removes the related data items from cache-memory pool 22.

If the information-granularity level of the cached data items is known on a "row level", then specific data items will be dropped from cache-memory pool 22. If the information-granularity level of some cached data items is only known on a "table level" (without the detailed information about the rows), then all cached data items associated with the table are removed cache-memory pool 22. If there is a chance that some cached data items are related to the data change that was made, then the cached data items are also removed from cache-memory pool 22. Information on cached data items that were removed from cache-memory pool 22 is recorded in an internal database in logger 14.

Data-proxy device 10 includes a large amount of RAM memory. Most of this memory is used to store cached data in cache-memory pool 22. In order not to overburden the available memory with data that is irrelevant, algorithms are used as part of cache-policy module 24 which serves as a cache-memory manager to hold the most-relevant and most-frequently-used data. In general, the relevance of data is primarily based on when the data was last requested. This means that the primary factor for determining cache-data "validity" is time-based. Each data item is cached by a pre-defined cache policy, and can be cached for variable amounts of time (e.g. several seconds to several minutes). Examples of cache policies include:
  (1) "For query strings that begin with . . . , store for 600 seconds":

```
<CachePolicy name = "Very.Long.Cache" enable = "true" duration = "600">
<query type = "CommandPrefix" > Board_GetNodeFieldMask</query>
<query type = "CommandPrefix" > Board_GetFieldsNamesList</query>
<query type= "CommandPrefix" >SELECT node_id, product_id FROM Te_nodes</query>
</CachePolicy>
```

(2) "For query strings that contain table names . . . , store for 300 seconds":

```
<CachePolicy name = "xxxx" enable = "true" duration = "300">
<query type = "Contains" > Table1</query>
<query type = "Contains" > Te_nodes</query>
<query type = "Contains" > Tbl5_tree</query>
</CachePolicy>
```

Cache-policy module 24 is also responsible for:
(1) matching the right cache policy to the query request and its result;
(2) inserting data into and retrieving data from cache-memory pool 22 via data-retrieval/command-execution module 18; and
(3) managing cached data and garbage collection (i.e. cache-data invalidation).

The query-specific key of the data item is located in cache-memory pool 22. Cache-policy module 24 manages a key list with the key mappings to database objects. Database objects can include: database tables, a list of rows in database tables, and tables and rows in a different database. The key list is used by data-consistency invalidation module 26 (as described above).

While cache-memory pool 22 is shown in FIG. 1 to reside in data-proxy device 10, as its name implies, cache-memory pool 22 can be a "pooled" memory resource of multiple data-proxy devices 10 (i.e. the combined memory of cache-memory pools 22 in multiple data-proxy devices 10). In implementations in which multiple data-proxy devices 10 are operationally connected to a common database server 4, distributed-cache management utility 30 is activated.

Distributed cache means several data-proxy devices 10 use the combined memory of cache-memory pools 22 to store and extract cached data items. Memory of all connected data-proxy devices 10 is treated as a single cache-memory pool. Once data is inserted into cache memory by one data-proxy device 10, the data is accessible to all other data-proxy devices 10. This is performed using "libevent" open-source-based algorithms (e.g. Memcached) in distributed-cache management utility 30. Coherence protocols (e.g. MESI or MOESI) can also be used for management of coherence of the cached data.

Cache policies are created based on the following arguments.
(1) How often is the specific query request received based on the log of query requests in logger 14?
(2) How often is the specific query request being changed and subsequently dropped from cache-memory pool 22?
(3) How much memory of cache-memory pool 22 is available to data-proxy device 10?
(4) In the case of distributed cache, how much combined memory of cache-memory pools 22 of all connected data-proxy devices 10 is available?

Upon initial connection of data-proxy device 10 to application server 2 and database server 4, query-request traffic is monitored, via monitoring utility 36, in order to create cache polices. An auto-learning mechanism can be periodically activated as well in order to improve and expand the cache policies for optimizing resource usage of data-proxy device 10, and for minimizing traffic to database server 4. Procedures are analyzed, via analyzer utility 34, in order to determine the mapping of tables and associated queries. Such analysis helps create cache policies and triggers.

Database-connection manager 20 is responsible for providing an application interface to execute commands in or retrieve data from database server 4. In order to connect to and execute operations in database server 4, database-connection manager 20 uses standard C/C++ native libraries (supplied by database vendors), or a native library of data-proxy device 10, which can be further optimized for improving performance of data-proxy device 10.

Database load-balancer 42 serves to balance the load (a) of multiple data-proxy devices 10 acting as a cluster, and (b) of database server 4 via database-connection manager 20 as a way of scaling out a database. When data responses are served to application server 2, the data is first prepared for delivery via data-preparation module 44, and then transferred to application server 2 via data-streaming module 46.

Failsafe utility 38 serves as a redundancy safeguard for hardware/software failures. Failsafe utility 38 is enabled by connecting at least two data-proxy devices 10. Upon the occurrence of a failure of one data-proxy device 10, another data-proxy device 10 will take over the functions of the failed data-proxy device 10. Connection of multiple data-proxy devices 10 will make the connected devices act as a cluster using virtual IP technology. The workload is balanced among the connected devices. Failure of a single device will result in failsafe utility 38 automatically switching to alternative devices that are still in the cluster and are still working.

It is noted that the components of data-proxy device 10 can be implemented as software modules, embedded hardware modules (e.g. RAM and CPU), and/or updateable firmware modules.

Figure 2:
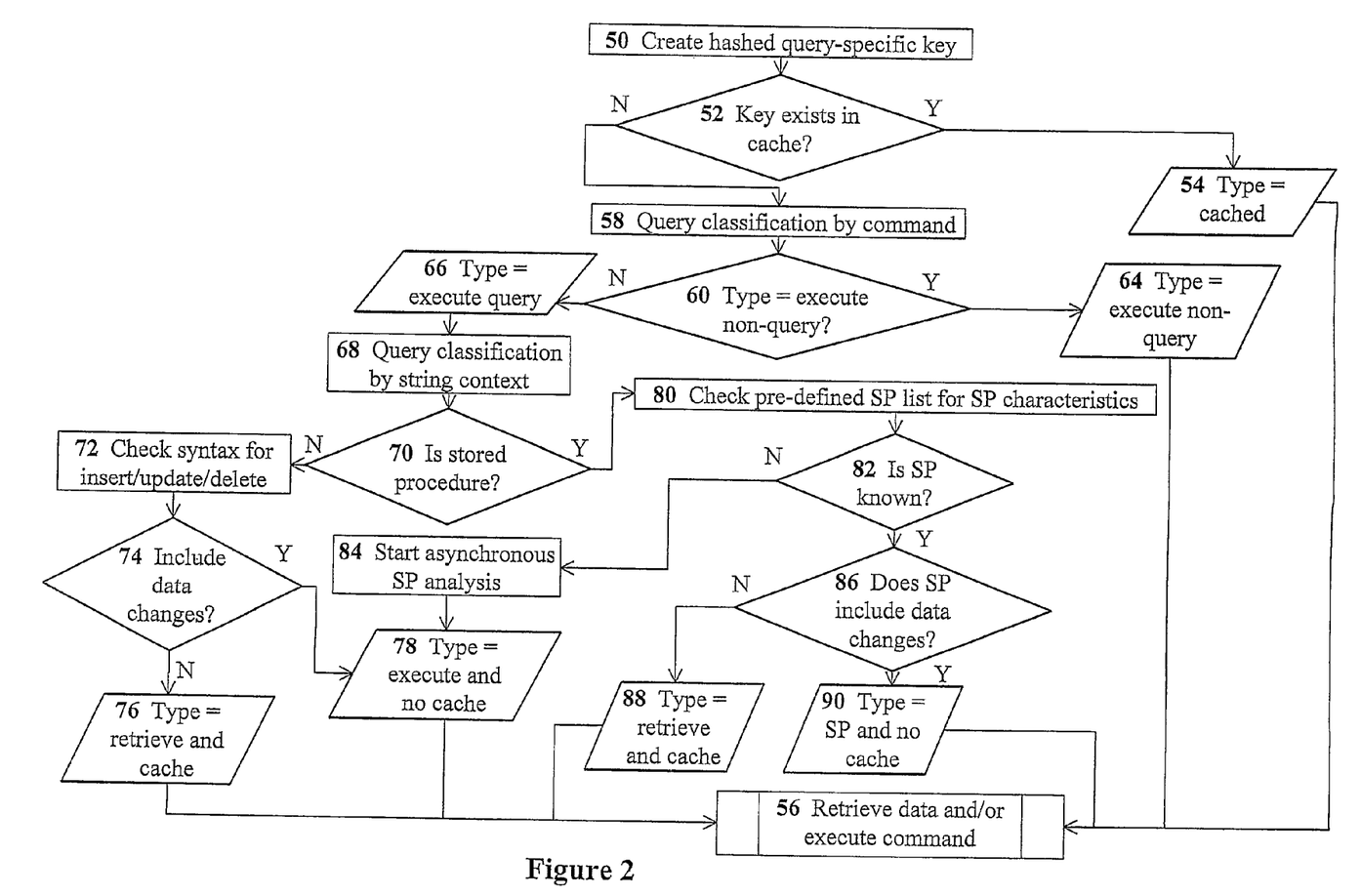
FIG. 2 is a simplified flowchart of the operational procedures of the request analyzer of FIG. 1, according to preferred embodiments of the present invention.

FIG. 2 is a simplified flowchart of the operational procedures of the request analyzer of FIG. 1, according to preferred embodiments of the present invention. The process starts with a hashed query-specific key being created for a query request (Step 50). The cache is checked to see if the key is present (Step 52). If the key is present in cache, then the query type is designated as "cached" (Step 54), and data retrieval and/or command execution is performed (Step 56).

If the key is not present in cache in Step 52, then the query request is classified by command (Step 58). The query type is checked to see if the classification is designated as "execute non-query" (Step 60). If the query type is "execute non-query", then the query type is designated as "execute non-query" (Step 64), and the process continues to Step 56.

If the classification is not designated as "execute non-query" in Step 60, then the query type is designated as "execute query" (Step 66), and the query is classified by string context (Step 68). It is then determined if the query request is a stored procedure (SP) (Step 70). If the query request is not an SP, then the syntax of the query request is checked for insert/update/delete (Step 72). The query request is then checked for data changes (Step 74). If there are no data changes, then the query type is designated as "retrieve and cache" (Step 76), and the process continues to Step 56. If there are data changes in Step 74, then the query type is designated as "execute and no cache" (Step 78), and the process continues to Step 56.

A stored procedure is a type of query request that can be executed by the client. SP-type requests are different from simple query requests because inside each SP can be a long executable code. For example: execute sp1 123, "vladi", "vexler". In order to understand what this command line means, data-proxy device 10 needs to read the body (i.e. metadata) of the SP. The body can include many "executables", for example: update table Table1 row number 123 with values "vladi", "Vexler"; get all transactions from tables "table2" and "table12" that belong to Vladi Vexler; or perform an update/insert and return data.

In order to know what each SP stands for, data-proxy device 10 has to analyze the SP.
Is the SP performing an insert/update, or only retrieving data?
Which database objects can be affected by the SP?
Which data items should be dropped from cache-memory pool 22 as a result of changes to database objects?

The amount of granularity of which objects can be affected by execution of current stored procedure (e.g. rows/columns in tables, columns in tables, or whole tables) depends on the complexity of the SP code. In the worst-case scenario, if the analysis of the stored procedure reaches the conclusion that it is not certain which objects can be affected by execution of the SP, then the SP is marked to invalidate the maximum number of cached items so the data will always have 100% consistency.

After the SP is analyzed, it enters a pre-defined SP list. The SP list explains to data-proxy device 10 what the consequences for executing the SP are. The process of analyzing SPs described above similarly applies to analyzing database metadata, triggers, and foreign keys for invalidating cached items. This is performed by parsing update query-requests and database metadata, for example. The result of such an analysis is a predefined list (or a rule-based "tree" of actions) which can be used in the invalidation decision-making process.

Returning to FIG. 2, if the query request is an SP in Step 70, then the SP characteristics are checked in a pre-defined SP list (Step 80). The SP is then determined to be known or unknown (Step 82). If the SP is unknown, then an asynchronous SP analysis is started (Step 84), and the process continues with Steps 78 and 56. If the SP is known in Step 82, then the SP is checked for data changes (Step 86). If there are no data changes, then the query type is designated as "retrieve and cache" (Step 88), and the process continues with Step 56. If there are data changes in Step 86, then the query type is designated as "SP and no cache" (Step 90), and the process continues with Step 56.

Figure 3:
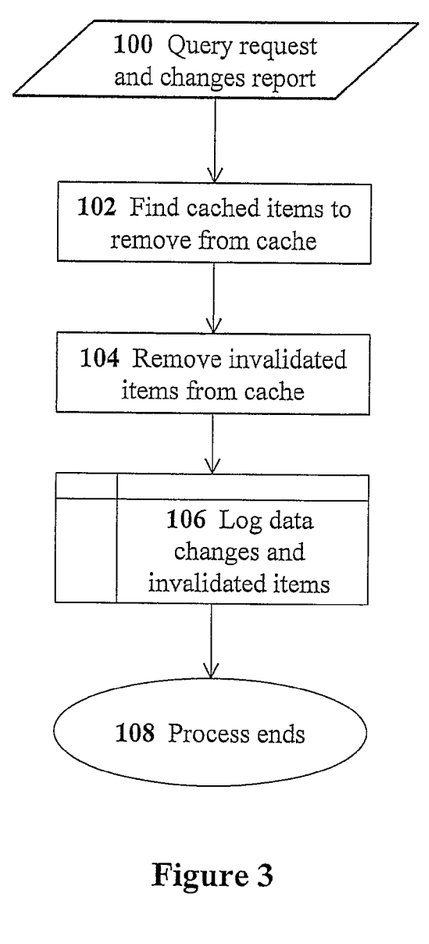
FIG. 3 is a simplified flowchart of the operational procedures of the data-consistency invalidation module of FIG. 1, according to preferred embodiments of the present invention.

FIG. 3 is a simplified flowchart of the operational procedures of the data-consistency invalidation module of FIG. 1, according to preferred embodiments of the present invention. The process starts by analyzing a query request and any reported changes (Step 100). Cached items are found and removed from cache (Step 102). Invalidated items are then removed from cache (Step 104). The data changes and invalidated items are logged (Step 106), and the process ends (Step 108).

FIG. 4 is a simplified flowchart of the operational procedures of the data retrieval/command execution module of FIG. 1, according to preferred embodiments of the present invention. The process starts by analyzing a query request, query-specific key, and query type (Step 110). The query type is then switched according classification (Step 112). A cached query-type (Step 114) results in data being retrieved from cache (Step 116), and the data being returned to the client (Step 118). A retrieve-and-cache (Step 120) query-type results in the query being executed in the database and the data response being retrieved (Step 122). The data is then inserted into cache asynchronously (Step 124), and the process continues with Step 118.

An execute-non-query (Step 126), SP-and-no-cache (Step 128), and execute-and-no-cache (Step 130) query-type result in checking for triggers, dropping triggered data keys, and changing the status of keys in cache to locked (Step 132). The queries are then executed in the database (Step 134), the trigger list in memory is unlocked asynchronously (Step 136), and the process continues with Step 118. Alternatively, after Step 110, the query is launched in the database with the database agent monitoring data changes (Step 138).

While the invention has been described with respect to a limited number of embodiments, it will be appreciated that many variations, modifications, and other applications of the invention may be made.

What is claimed is:

1. A data-proxy device for providing distributable middleware data proxy, the device comprising:
    a transparent application server-connection manager operative to exchange application server data with at least one application server which requests data via database query requests, the application server-connection manager being further operative to return data responses to the application server, wherein the application server connection manager communicates with the application server using a communication protocol used by the application server;
    a request analyzer for analyzing database query requests from said at least one application server;
    a data-retrieval/command-execution module for executing said database query requests;
    a database-connection manager operative to exchange database data between at least one database server and the data-retrieval/command-execution module, the database-connection manager being further operative to provide an application interface to execute commands in or retrieve data from the at least one database server;
    a RAM memory functioning as a cache-memory pool for storing data items from said at least one database server;
    a cache-policy module for determining cache criteria for storing said data items in said cache-memory pool; and
    a data-consistency invalidation module configured to
    determine for removal invalidated data items based on invalidation criteria related to a relevance of the data items stored in the cache-memory pool; and
    predefine a list of data change triggers based on dependencies between database objects, tables, triggers, stored procedures, foreign keys, and database metadata in at least one database server; and parse an analysis of query-string context,
    wherein said data-retrieval/command-execution module is operative to carry out at least one of: returning data from the cache-memory pool to the application server connection manager; executing a query in the database server and returning the database response to the application server connection manager; identifying data change triggers from the database query request and from a list of data change triggers predefined by the data consistency invalidation module for detecting data changes;
    activating triggers for detecting said invalidated data items; and
    launching triggers for invalidating cached data from the cache-memory pool.

2. The data-proxy device of claim 1, wherein said request analyzer is configured for:
    creating hashed query-specific keys of said database query requests; and
    identifying a query type of said database query requests.

3. The device of claim 1, wherein said cache-memory pool is configured to utilize respective memory modules residing in a plurality of operationally-connected data-proxy devices to store and extract cached data items.

4. The data-proxy device of claim 3, the device further comprising: a distributed-cache management utility for managing memory capacity in said plurality of memory modules.

5. The data-proxy device of claim 4, wherein said distributed-cache management utility enables said memory capacity to be utilized as a single memory cluster of the plurality of memory modules in order to balance workloads of said memory capacity and availability.

6. The data-proxy device of claim 1, the device further comprising: a logger for storing details of said database query requests into an internal database that provides a basis for cache-policy creation and statistical analysis via the cache-policy module and a statistics-audit module, respectively; a source for monitoring data-flow statistics via the statistics-audit module and a monitoring utility; and a resource for auditing security via a security utility.

7. The data-proxy device of claim 6, wherein said details includes at least one detail selected from the group consisting of: each said database query request, a hashed query-specific key, a request type, a query date/time, application server information, database-server details, data-retrieval source objects, cache type, data checksum, a data-retrieval date/time, a timestamp, application server identification information, and query request information.

8. The data-proxy device of claim 1, the device further comprising:
   a database agent for: monitoring data changes in said at least one database server including "back-end" data changes that comprise at least one of: batch commands, DTS execution, execution of commands other than data-proxy device, and direct online changes by a DBA; and reporting said data changes to said data-consistency invalidation module.

9. The data-proxy device of claim 1, the device further comprising: a failsafe utility for enabling an alternate data-proxy device, operationally connected to the device, to provide device functionality upon an occurrence of a device failure and a bypass for directing query requests directly to the at least one database server as a failsafe in case of all data proxy failures.

10. The data-proxy device of claim 1, the device further comprising: a database load-balancer for load-balancing of queries requests in said at least one database server.

11. The data-proxy device of claim 1, the device further comprising: a special-procedures analyzer utility for mapping and analyzing database metadata, triggers, and foreign keys and the associated database queries by parsing and analyzing executable code in said database and in said database query requests and building a predefined list or a rule-based "tree" of actions to be used in the invalidation decision-making process for cached data.

12. The data-proxy device of claim 1, wherein said cache criteria include at least one criterion selected from the group consisting of: a query-request frequency, a data-change frequency, and an available cache-memory capacity.

13. The data-proxy device of claim 1, wherein said invalidation criteria include at least one criterion selected from the group consisting of: an update in said database data, a deletion in said database data, an insertion in said database data, an update in secondary database data referenced in said database data, a deletion in said secondary database data referenced in said database data, and an insertion in said secondary database data referenced in said database data.

14. The data-proxy device of claim 1, wherein said request analyzer is configured for parsing said database query requests.

15. The data-proxy device of claim 14, wherein said parsing assists in identifying said invalidated data items.

16. The data-proxy device of claim 1, wherein the data-proxy device is configured to interface a read-write database, and wherein the data-consistency invalidation module is configured to determine invalidated data items based on real-time analysis of data requests of write type with respect to database objects in the data request.

* * * * *